Patented Apr. 8, 1952

2,592,370

UNITED STATES PATENT OFFICE 2,592,370

COMPOUNDS OF THE QUINOPHTHALONE SERIES AND METHOD FOR THEIR PRODUCTION

Frithjof Zwilgmeyer, Wilmington, Del., assignor to E. I. du Pont de Nemours & Company, Wilmington, Del., a corporation of Delaware No Drawing. Application February 18, 1950, Serial No. 145,098

11 Claims. (Cl. 260—287)

This invention relates to novel compounds of the quinophthalone series.

It is an object of this invention to provide a new series of compounds by the condensation of quinaldine or various derivatives thereof on the one hand with pyromellitic acid on the other hand, and to produce by such synthesis compounds which are useful both as dyestuffs per se and as intermediates for the preparation of dyestuffs of more complicated structure by further treatment. Additional useful objects of this invention will appear as the description proceeds.

The novel compounds of this invention may be designated broadly as quinophthalones bearing two adjacent carboxy groups in the phenyl ring of the phthalone radical, or salts or anhydrides of such two carboxy groups. Accordingly, their free acid form may be represented by the general formula

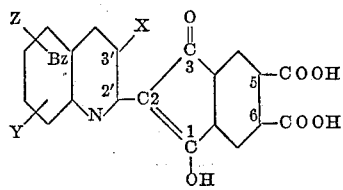

wherein X may be hydrogen or a hydroxyl group, while the Bz nucleus of the quinolyl radical may bear substituents Y, Z which may designate halogen, methyl, phenyl or benzo.

Inasmuch as compounds of this general structure are capable of existing in various tautomeric forms, they may also be looked upon as 2-quinolyl derivatives of 5,6-dicarboxy-1,3-indanedione, as indicated by the following formula

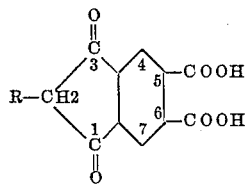

wherein R represents a 2'-quinolyl radical which may bear various inert (that is non-acidic and non-basic) substituents, for instance an OH group in the 3'-position and halogen, methyl, phenyl or benzo in the Bz-ring. The invention includes also the anhydrides and salts of such dicarboxylic acids.

My novel compounds are synthesized by condensing a suitable quinaldine with pyromellitic acid anhydride by methods which per se are known, except that I react these materials in substantially equimolecular proportions, whereby to assure that one and only one phthalone ring shall be formed. In this fashion I assure that the product shall possess two adjacent carboxy groups in the phenyl ring of the phthalone portion of the molecule.

The reaction of synthesis may be illustrated by taking the case of simple quinaldine and the dianhydride of pyromellitic acid as an example:

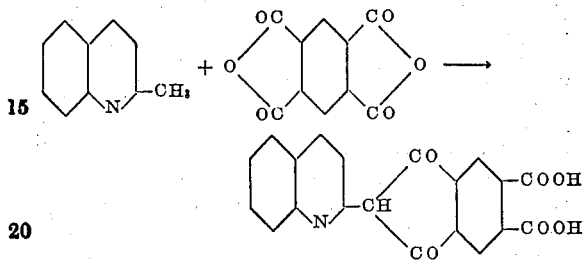

By virtue of the two carboxy groups in the phenyl ring, the product becomes exceedingly flexible chemically and adaptable in utility. Thus, the quinophthalones of the prior art having no free carboxy groups are organic-solvent soluble pigments, and can be converted into dyestuffs only by sulfonation (Col. Index Nos. 800 and 801). The novel compounds of my invention, however, dissolve in aqueous alkali to form a solution of the corresponding salt, and such solutions are useful directly for dyeing various textile fibers, especially wool and nylon. They may also be readily converted into the dicarboxylic acid anhydride, in which form they possess the same general reactivity as phthalic anhydride and may be used for the same general purposes. Thus, the anhydride of my novel compounds may be condensed with benzene or various derivatives thereof, by the customary Friedel-Crafts reaction, to give compounds corresponding to o-benzoyl benzoic acid. Like the latter, such o-benzoic acid compounds may then be ring closed to give anthraquinone type compounds which may be used as vat dyes.

Or again, the anhydrides of my novel dicarboxylic acids may be condensed with urea and cupric salts according to methods per se known (see for instance U. S. P. 2,197,458 and 2,214,477), to give compounds of the phthalocyanine series, which are useful as pigments.

In general, my novel compounds, either in the form of free dicarboxylic acid or in the form of anhydride, may be subjected as a rule to all the syntheses of which o-phthalic acid and phthalic anhydride are capable, yielding analogous but novel compounds.

By reacting the anhydride with ammonia or various organic primary amines, my novel compounds are transformed into the corresponding imides. The latter again can serve as intermediates for numerous reactions for which phthalimide is normally employed.

In the synthesis of my novel compounds, I may use as source for the desired quinolyl radical the corresponding 2-methyl-quinoline (quinaldine); 3-hydroxy-quinaldine; Bz-monochloro, monobromo-, dichloro- or dibromo-3-hydroxy-quinaldine; Bz-chloro-methyl-quinaldine; 5 or 8-phenylquinaldine, 5,6- or 7,8-naptho-quinaldine or any of the aforegoing or similar compounds possessing further a COOH group in the 4-position. The point is, that during the synthesis this COOH group is somehow eliminated, being replaced by a hydrogen atom, so that the final compound is the same whether one starts with a given quinaldine or with its 4-carboxy analog.

It is of interest in this connection that quinaldine has been reacted with pyromellitic acid in the art heretofore, but for some reason the art took careful pains to provide a very large excess of the quinaldine compound, so as to insure a quick transformation of both pairs of ortho-COOH groups into corresponding phthalone rings. The result was a compound having two phthalone rings and no free COOH groups. It could be used as a dyestuff, only after sulfonation.

As pyromellitic component in my synthesis I prefer to use pyromellitic acid itself ( i. e. 1, 2, 4, 5-tetracarboxybenzene) or its anhydride (that is, the dianhydride, the monoanhydride not being known in the literature.)

The key to my novel synthesis is, as already indicated, the use of substantially equimolecular proportions of the quinaldine component and the pyromellitic component. By substantially equimolecular I mean equal molar proportions with a tolerable variation of not more than 5% either way. Otherwise, the reaction proceeds along customary lines. For instance the two components are heated together in the presence of an inert organic liquid diluent such as trichlorobenzene, orthodichlorbenzene, nitrobenzene, chloronaphthalenes, etc. at temperatures at or near the reflux temperature of the diluent, and in general say between 170° and 250° C. Recovery is effected by filtering, with or without prior dilution of the reaction mass with an optional inert liquid diluent, for instance petroleum ether, ligroin, carbon tetrachloride, etc. The product may be purified by dissolving the same in aqueous caustic soda, followed by filtration and acidification to precipitate the dicarboxylic acid. Salts of the product, especially water-soluble salt may be readily obtained by dissolving the dicarboxy acid in an aqueous solution of the corresponding hydroxide for instance sodium, potassium or ammonium hydroxide, and concentrating the latter by evaporation, to crystallize out the desired salt.

The anhydrides of my novel compounds are obtained by heating the dicarboxylic acid in an inert solvent, e. g. trichlorobenzene, above 160° C. until elimination of water is complete, or by reacting the same with acetic anhydride in an excess of the latter or in an inert solvent.

In the form of their water-soluble salts, my novel compounds possess affinity for wool and nylon, dyeing these from a neutral or acidic aqueous bath in greenish yellow, yellow and orange shades of exceptionally good light fastness. Their tinctorial strength in such dyeings is also very great. For example, a 0.25% dyeing of some of my novel compounds on wool or nylon corresponds in strength to that of a 1% or more concentrated dyeing by other commercial dyes in the same color range.

Without limiting my invention, the following examples are now given to illustrate my preferred mode of operation. Parts mentioned are by weight.

*Example 1*

14.3 parts of quinaldine are introduced into a slurry of 21.8 parts of pyromellitic anhydride in 100 parts of trichlorobenzene during about 2 hours at a temperature of about 190° C. and under good stirring. The reaction mixture is heated for an additional 2 hours while maintaining the above temperature.

It is then cooled to room temperature, whereupon 100 parts of petroleum ether are added, and solids are filtered off and washed with 100 parts of the ether. The brown powder obtained is dissolved in 3000 parts of water by adding caustic soda until the mass is alkaline to Clayton Yellow. The obtained solution is filtered to remove traces of insoluble matters. The clarified solution is then acidified by adding slowly hydrochloric acid until the mass is acid. The solid obtained is filtered off, washed free of acid and dried. The dark yellow powder obtained is presumably the free dicarboxylic acid corresponding to the formula:

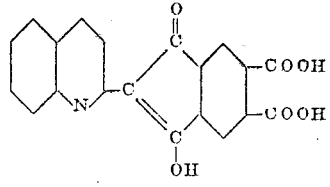

The soda salt of this product is water-soluble, and dyes wool or nylon a bright yellow shade, of good strength and fastness properties.

*Example 2*

20.3 parts of 2-methyl-3-hydroxy quinoline-4-carboxylic acid are introduced into a slurry of 21.8 parts of pyromellitic anhydride in 100 parts of trichlorobenzene during about 1 hour at 190° C. with good stirring, and the reaction mixture is heated for an additional 2 hours at 185° to 195° C. It is then cooled to room temperature, 100 parts petroleum ether are added, and the solid matter is filtered off and washed with 100 parts of petroleum ether. The obtained powder is dissolved in 3000 parts of water by means of caustic soda (alkaline to Clayton Yellow). The obtained solution is filtered to remove traces of insoluble matters, and the clarified solution is acidified with hydrochloric acid. The solid obtained is filtered off, washed free of acid and dried.

The dark yellow powder obtained is probably the free acid, having the following formula

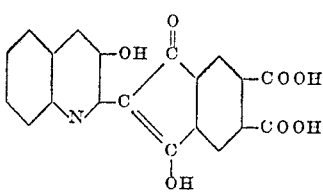

The soda salt of this product is water soluble and dyes wool and nylon a bright yellow shade, of good strength and fastness properties.

*Example 3*

15.9 parts of 2-methyl-3-hydroxy-quinoline are introduced in a slurry of 21.8 parts of pyromellitic anhydride in 100 parts of trichlorobenzene during about 1 hour at 190° C. with good stirring, and the reaction mixture is heated for an additional 2 hours at 185° to 195° C. It is then worked up as in the preceding examples. 29 parts of a dark yellow powder is obtained which is identical with the product of Example 2, indicating that the carbon dioxide in the 4-position of the quinoline ring in Example 2 came off during the reaction.

*Example 4*

27.4 parts of 2-methyl-3-hydroxy-6,8-dichloro quinoline-4-carboxylic acid (obtained in known manner from 5,7-dichloroisatine and chloro- acetone in the presence of calcium hydroxide; see for instance, French Patent No. 784,365) are introduced into a slurry of 21.8 parts of pyromellitic anhydride in 100 parts of trichloro- benzene, during about 15 minutes at 190° C. with good stirring. This temperature was then main- tained for an additional 2 hours. The mass is then worked up in the same manner as in Ex- amples 1 and 2. A dark yellow powder is obtained which, in form of the free acid has the following formula

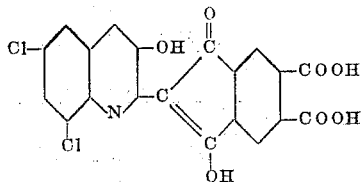

The disodium salt of this acid is water-soluble and dyes wool and nylon a bright reddish yel- low of good fastness properties.

*Example 5*

28.3 parts of 2-methyl-3-hydroxy-6-bromo- quinoline-4-carboxylic acid (obtained from 5- bromoisatine and chloroacetone in the presence of calcium hydroxide, in known manner; id.), are introduced into a slurry of 21.8 parts of pyromellitic anhydride in 100 parts of trichloro- benzene during about 15 minutes at 190° C. with good stirring, whereupon this temperature is maintained for an additional 2 hours. The mass is then worked up as in the preceding examples.

A dark yellow powder is obtained, the soda salt of which is water-soluble and dyes wool and nylon a bright reddish yellow shade of good fastness properties.

*Example 6*

36.3 parts of 2-methyl-3-hydroxy-6,8-dibromo- quinoline-4-carboxylic acid (obtained from 5,7- dibromoisatine and chloroacetone in the presence of calcium hydroxide in known manner) are in- troduced into a slurry of 21.8 parts of pyromel- litic anhydride in 100 parts of trichlorobenzene during about 15 minutes at 190° to 195° C. and under good stirring, whereupon this temperature is maintained for an additional 3 hours. The mass is then worked up as in Example 1.

A dark yellow powder is obtained, the soda salt of which is water-soluble and dyes wool and nylon a bright yellowish orange shade of good fastness properties.

*Example 7*

25.2 parts of 2,8-dimethyl-3-hydroxy-7-chloro- quinoline-4-carboxylic acid (obtained from 6- chloro-7-methylisatine and chloroacetone in the presence of calcium hydroxide in known man- ner), are introduced into a slurry of 21.8 parts of pyromellitic anhydride in 100 parts of trichlorobenzene during about 30 minutes at 190° C., with stirring. This temperature is then maintained for an additional 2 hours, whereupon the mass is worked up as in Example 1.

A dark yellow power is obtained, the soda salt of which is water-soluble and dyes wool and nylon a bright yellow shade of good fastness properties.

*Example 8*

19.5 parts of 5,6-naphthoquinaldine are intro- duced into a slurry of 21.8 parts of pyromellitic anhydride in 200 parts of trichlorobenzene, dur- ing about 1 hour at 190° C., under good stirring. This temperature is then kept for an additional 3 hours, after which the mass is worked up as in the preceding examples.

A bright yellow powder is obtained which pre- sumably has the following formula

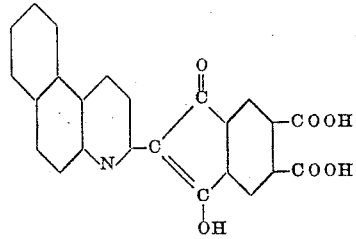

The soda salt of this acid is water-soluble and dyes wool and nylon a bright reddish-yellow shade.

*Example 9*

22.2 parts of 8-phenylquinaldine (obtained by heating ortho aminodiphenyl in the presence of hydrochloric acid and nitrobenzene with croton- aldehyde in known manner; see for instance, U. S. P. 2,211,662), is introduced into a slurry of 21.8 parts of pyromellitic anhydride in 100 parts of trichlorobenzene during about 1 hour at 190° C., and under good stirring. After keeping this temperature for an additional 3 hours, the mass is worked up as in the preceding examples.

A dark brown powder is obtained which pre- sumably has the following formula

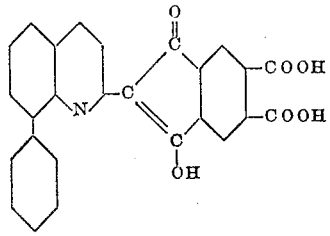

The soda salt of this acid is water-soluble and dyes wool a reddish yellow shade.

It will be understood that the procedures of the above examples may be varied widely in detail and may also be applied to the production of other compounds of this series from variously substituted quinaldines, 3-hydroxy-quinaldines or 4-carboxy-3-hydroxy-quinaldines.

The products of the above examples may be converted to the corresponding anhydrides by heating the same with an equimolecular quantity of acetic anhydride in an excess of the latter or in an inert organic solvent, such as trichlorobenzene. For instance, when 1 part of the product of Example 1 is heated with 3 to 10 parts of acetic anhydride to about 130° C. until a clear solution is formed, the following reaction takes place

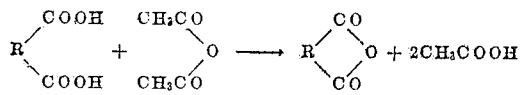

(R being used here to represent the remainder of the quinolylindanedione molecule). The solvent or excess acetic anhydride, and the acetic acid formed in the reaction are then evaporated under vacuum, and the novel anhydride remains behind in the solid residue.

Alternatively, the anhydrides may also be formed by heating the novel dicarboxylic acids in trichlorobenzene, or other convenient inert organic diluent, at a temperature above 160° C. until elimination of water is completed. The diluent is then evaporated off under vacuum, leaving behind the solid anhydride.

I claim as my invention:

1. A compound of the group consisting of the free acid form, anhydrides and salts of the quinophthalone-dicarboxylic acids represented by the general formula

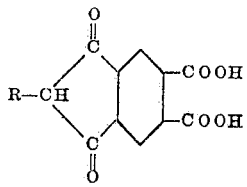

wherein R represents a 2-quinolyl radical selected from the group consisting of 2-quinolyl, 3-hydroxy-2-quinolyl and derivatives of these obtained by substitution in the Bz ring by substituents selected from the group consisting of halogen, methyl, phenyl and benzo radicals.

2. 5,6-dicarboxy-2-quinolyl-1,3-indanedione.

3. The anhydride of the compound defined in claim 2.

4. 2(3'-hydroxy-quinolyl) - 1,3 - indanedione-5,6-dicarboxylic acid.

5. The anhydride of the compound defined in claim 4.

6. The disodium salt of the compound defined in claim 4.

7. A process for producing a compound of the quinophthalone series having reactive COOH groups, which comprises condensing pyromellitic acid anhydride and a quinaldine in equimolecular proportions to form a compound having one and only one phthalone ring.

8. A process as in claim 7, the quinaldine being one selected from the group consisting of 2-methyl-quinoline, 3-hydroxy-2-methyl quinoline, 4-carboxy-3-hydroxy-2-methyl quinoline and compounds derived from these by substitution in the Bz ring by substituents selected from the group consisting of halogen, methyl, phenyl and benzo radicals.

9. A process as in claim 8, the compound being isolated in the form of free dicarboxylic acid.

10. A process as in claim 8, the compound being isolated in the form of disodium salt.

11. A process as in claim 8, the compound being isolated in the form of dicarboxylic acid anhydride.

FRITHJOF ZWILGMEYER.

REFERENCES CITED

The following references are of record in the file of this patent:

UNITED STATES PATENTS

| Number | Name | Date |
|---|---|---|
| 2,006,022 | Kranzlein et al. | June 25, 1935 |

FOREIGN PATENTS

| Number | Country | Date |
|---|---|---|
| 816,991 | France | May 10, 1937 |